United States Patent [19]

Stableford

[11] Patent Number: 4,776,543
[45] Date of Patent: Oct. 11, 1988

[54] AIRCRAFT FLYING CONTROL SYSTEMS

[75] Inventor: William E. Stableford, Woodford, United Kingdom

[73] Assignee: British Aerospace Public Limited Company, London, England

[21] Appl. No.: 920,065

[22] Filed: Oct. 17, 1986

[30] Foreign Application Priority Data

Oct. 17, 1985 [GB] United Kingdom ............... 8525631

[51] Int. Cl.⁴ ............................................ B64C 13/30
[52] U.S. Cl. ................................ 244/232; 244/75 R; 74/501.5 R
[58] Field of Search .................. 244/232, 233, 75 R, 244/220, 221, 224; 74/501 R, 501.5, 96, 110, 470, 487

[56] References Cited

U.S. PATENT DOCUMENTS

| | | | |
|---|---|---|---|
| 3,599,507 | 8/1971 | Exton | 244/224 |
| 4,198,877 | 4/1980 | Huling | 74/501.5 R |
| 4,318,308 | 3/1982 | Monteillet | 244/232 |
| 4,529,155 | 7/1985 | Bramwell et al. | 244/232 |
| 4,540,141 | 9/1985 | Durno et al. | 244/232 |

Primary Examiner—Galen Barefoot
Assistant Examiner—Rodney Cori
Attorney, Agent, or Firm—Cushman, Darby & Cushman

[57] ABSTRACT

A flying control system for aircraft in which a control circuit comprising a cable and quadrant pulley arrangement is arrange to effect pivotal displacement of a control surface in response to pilot's control demand, the control circuit including system disengagement means whereby if one of the cables is broken or becomes disconnected, the disengagement means will effectively isolate the control surface or pilot's control demand input means from adverse residual control forces arising as a result of the cable break or disconnect. By this arrangement the secondary or standby control system is isolated from adverse control limitations which may arise as a consequence of cable severance in, for example, the primary control device.

4 Claims, 4 Drawing Sheets

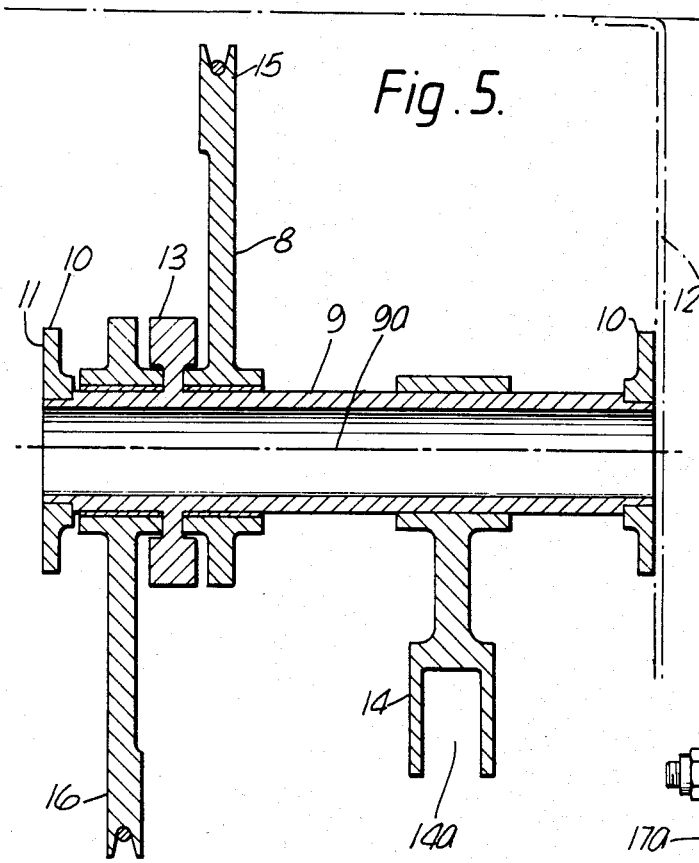
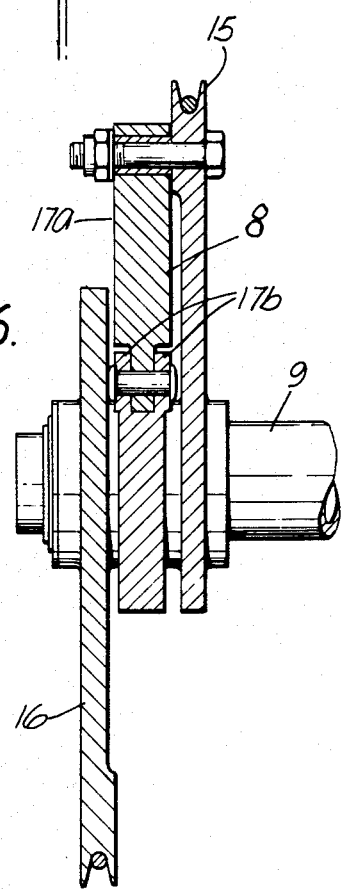

AIRCRAFT FLYING CONTROL SYSTEMS

This invention relates to aircraft flying control systems of the type whereby pilots control demand is transmitted to control surface means by cable and quadrant pulley means. More particularly it relates to such a system whereby, in the event of the severance of one of the cables in any particular control circuit, that circuit is effectively isolated to obviate undesirable control limitations arising from the severance.

In such systems, the said cables are pre-loaded or tensioned, with or without a mechanical tension regulator, so as to remain at the required tension throughout the thermal expansion/contraction range of the airframe; that is to say to accomodate the widely divergent temperature changes to which the airframe may be subjected throughout its operating range thus avoiding induced slackness in the cable system which could lead to undesirable disparity between pilot demand and control surface response.

In the event of a single cable break or disconnection in a control circuit, this induced pre-tension will result in the elastic recovery of the remaining cable or cables leading to an undesirable change in positioned alignment between the driving and driven elements of the system.

Airworthiness regulations demand that the aircraft shall remain controllable after single cable failures or after certain multiple failures particularly where such multiple failures can arise from a common cause, (e.g. explosive engine failures where control elements may be severed by debris). In certain prior art control systems, redundancy is incorporated such that, despite the severance of one of the cables, the system can continue to be operated throughout its full control regime. For example, patent number GB2006698 provides a redundant flight control system utilising pilot actuated cables to rotate a control quadrant and utilising pre-loaded springs additionally connecting each cable to the quadrant so that if one of the cables is severed the spring connected between the other cable and the quadrant allows the quadrant to be rotated in the same direction as that produced by the severed cable thus maintaining the integrity of the system. Similarly prior art patent GB2000699 teaches an alternative arrangement utilising balanced, pre-loaded springs connected to the quadrant to be automatically selectively releasable in response to cable severance so that the quadrant can be pilot actuated throughout its full control regime despite the severance of one of its cables.

In certain control systems, and especially the primary control system, the means of achieving failure survivability may make it preferable that whether the failure occurs in one or both cables of a particular cable loop, the effect should be simultaneous loss of tension in both cables such that the primary circuit is effectively isolated thereby preventing control limitations arising when the secondary or standby system assumes control.

It is the object of the present invention to provide an aircraft with a flying control system whereby severance or disconnection of either cable or cables results in an effective disconnection of those cables and isolation of the control circuit from the aircraft flight control means.

According to one aspect of the present invention there is provided a flying control system for aircraft said system including control surface means and control circuit means for effecting pivotal displacement of control surface means in response to pilot's control demand, said circuit means including cable and quadrant pulley means, characterised in that system disengagement means is provided in said control circuit means whereby should a cable break or disconnect occur in said circuit means, said disengagement means will render said circuit means ineffective thereby effectively isolating said control surface means or pilot's control demand input means from adverse residual control forces arising as a result of said cable break or disconnect.

One embodiment of the invention will now be described by way of example only, with reference to the accompanying drawings in which:

FIG. 5 is a vertical section through the release unit along a line V—V in FIG. 4.

FIG. 6 is a further section through the release unit along a line VI—VI in FIG. 4.

Figure 1:
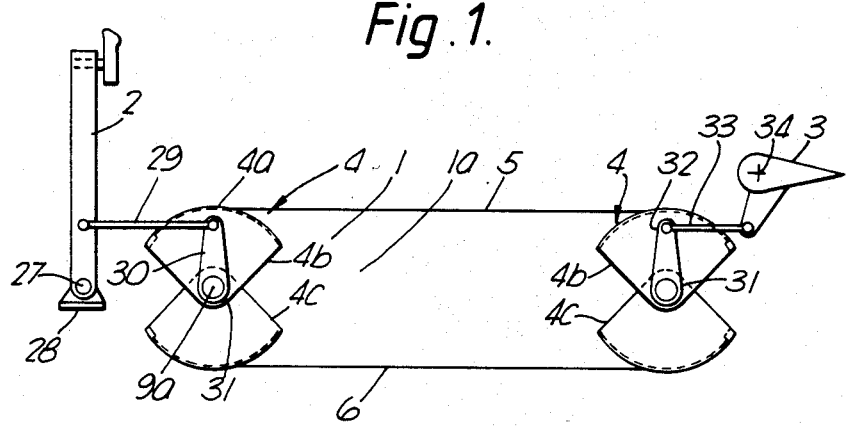
FIG. 1 is a diagrammatic arrangement of a conventional cable and quadrant pully control system.

Referring to the drawings, FIG. 1 illustrates schematically a well known and typical elevator control arrangement 1 characterised in that pilot's control demand input by means of a control column 2 is transmitted to elevator 3 via an interconnecting cable and quadrant pulley circuit assembly 4. The control column 2 is pivotally located at 27 to the fixed aircraft structure 28 and is pivotally connected by means of push rod 29 to a lever arm 30 located vertically to a transversely disposed control shaft 31 rotatably located to the aircraft structure.

Figure 2:
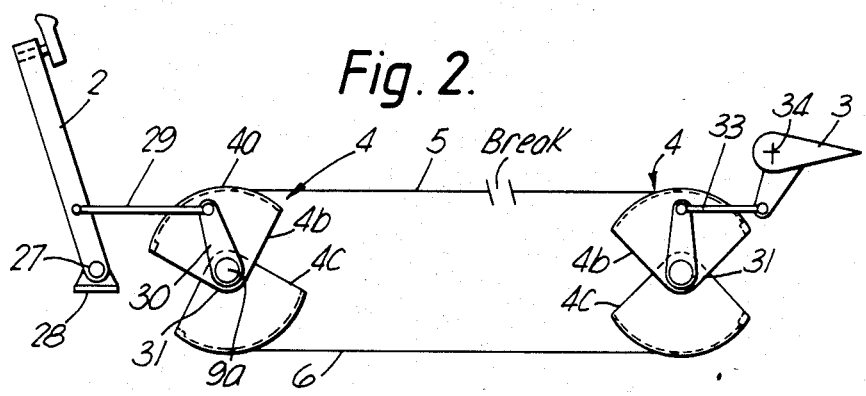
FIG. 2 is a further diagrammatic arrangement of the same system but incorporating a single control cable break.

A further quadrant pulley assembly 4a is mounted rearwardly of the aircraft on a transversely extending control shaft 31 to which is similarly located a vertically disposed lever arm 32 pivotally interconnected by means of a push rod 33 to the elevator 3 which is pivotally mounted to the fixed aircraft structure about a hinge axis 34. The upper and lower quadrant portions 4b and 4c are in fixed relationship to each other. Upper and lower cables 5 and 6 are located at their respective ends to the quadrant portions 4b and 4c and pre-tensioned to a pre-determined load on installation within the aircraft so as to remain at the required tension throughout the thermal expansion/contraction range of the aircraft. This pre-tensioning may be achieved by the use of turnbuckles (not shown) or by means of tension regulators (not shown) incorporated into the circuit. However, in the event of a single cable break or disconnection, as illustrated in FIG. 2 the resulting elastic recovery of the remaining cable may induce an undesirable limitation on the pilot's range of control movement available from the standby flight control system. For example, the control column 23 may be angularly displaced relative to the surface 3 positioned by the trim tab or, with the use of powered controls, the surface 3 may move relative to a stationary control column.

Figure 3:
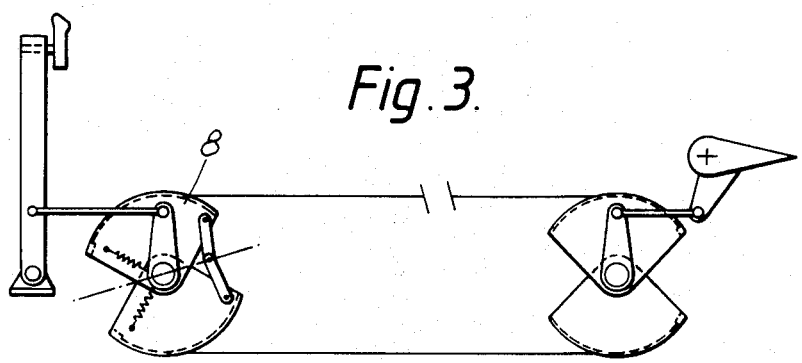
FIG. 3 is yet a further diagrammatic arrangement of the system with a single control cable break but with the tension release unit of the present invention incorporated.

Referring now to FIG. 3 a tension release unit 8 in accordance with the present invention replaces the conventional forward quadrant pulley assembly 4a such that, as hereinafter described, the severance or disconnection of either cable 5 or 6 results in an effective disconnection of both cables from pilot's control means such that the elastic recovery of the remaining cable will in no way impart undesirable limitations on the effectiveness of the standby control system.

The tension release unit 8 is illustrated by reference to FIGS. 4, 5 and 6. A control shaft 9 is rotatably supported in bearing brackets 10 mounted off structural elements 11 and 12 about a transverse rotational axis 9a. The shaft is integrally machined to include a concentric disc 13 and further includes a control lever 14 rigidly mounted upon it. Rotatably mounted upon the shaft 9 are two opposing quadrant pulleys 15 and 16 located to either side of and in abutment with the concentric disc 13.

Figure 4:
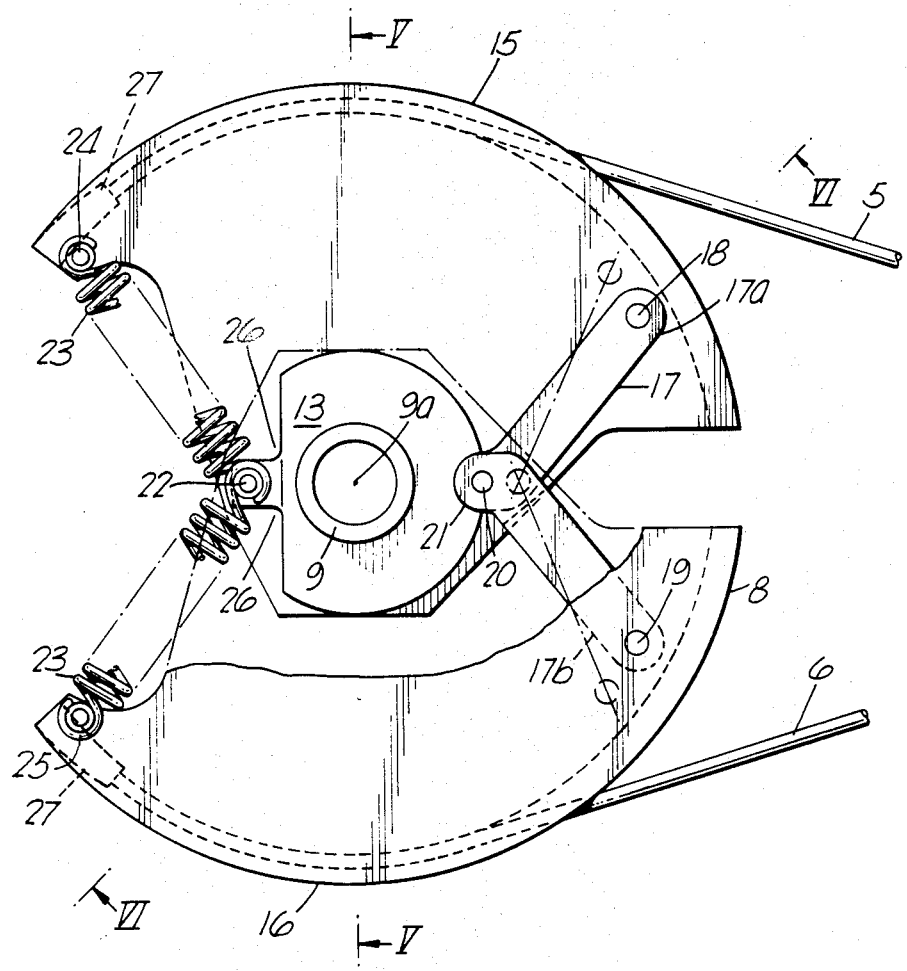
FIG. 4 is a side elevation on a cable tension release unit according to the invention.

With particular reference to FIG. 4, the lower quadrant pulley 16 is locally cut-away for descriptive purposes to more clearly show the assembly. The two quadrant pulleys 15 and 16 are connected together by a linkage assembly 17 comprising a pair of opposing links 17a and 17b. The link 17a has a pivotal attachment 18 to the upper quadrant pulley 15 and the link 17b a pivotal attachment 19 to the lower quadrant pulley 16. The links are pivotally attached to each other at 20 and both links are commonly configured to engage a semi-circular recess 21 in the periphery of the concentric disc 13. The concentric disc on the side remote from the recess 21 provides a pivotal attachment 22 for two springs 23 which are pivotally attached at 24 and 25 to the quadrant pulleys 15 and 16 respectively. The concentric disc 13 is locally rebated at 26 to provide adequate clearance for the springs. Two control cables 5 and 6 are shown engaging the grooves in the upper and lower quadrant pulleys to which each cable is respectively anchored at 27.

Referring once again to the linkage assembly 17 and its engagement with the semi-circular recess 21, in normal operation the induced tensions in the cable 5 and 6 will maintain a positive engagement force such that the quadrant pulley portions 15 and 16 are constrained to move together in response to pilot's demand input via lever 14. The springs 23 are arranged in such a way as to oppose the induced cable tension on their respective sides but with a load always less than the cable tensions.

Figure 7:
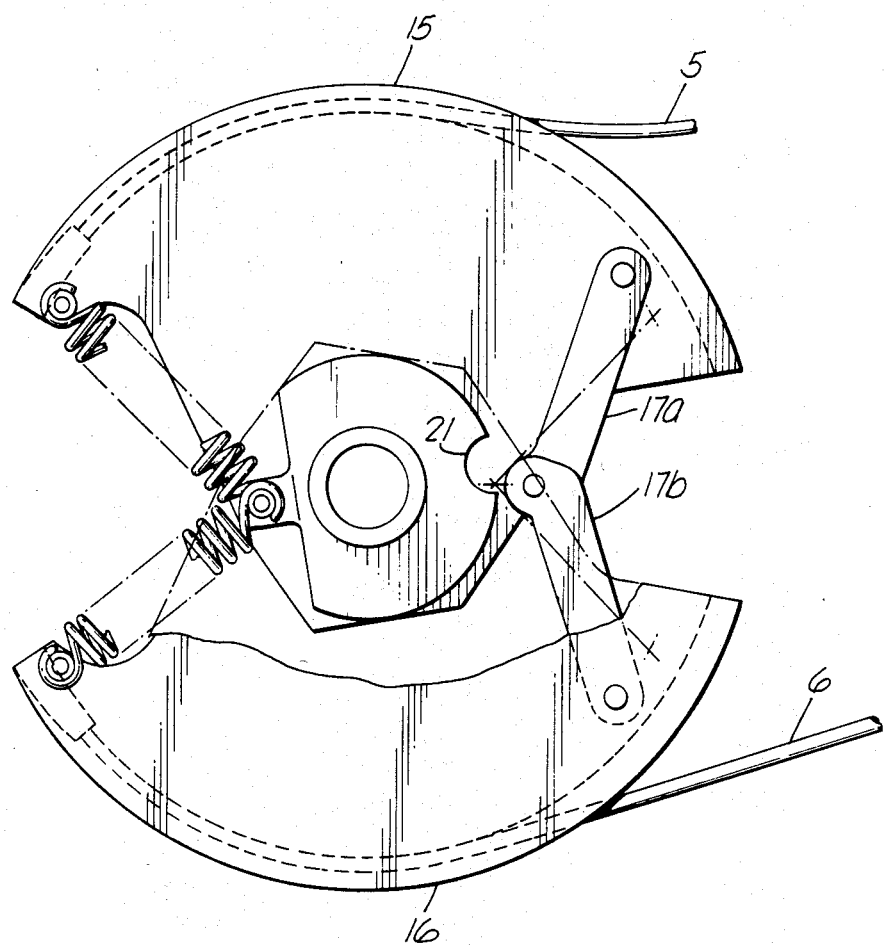
FIG. 7 is a part elevation on the cable release unit illustrating the tension release unit in the disengaged mode.

In operation, with reference to FIG. 7, in the case of a single cable break or disconnection or the simultaneous failure in both cables resulting in a release of induced cable tensions, the spring associated with the failed cable will cause the respective quadrant pulley portions 15 and 16 to move in an anti-clockwise or clockwise direction respectively. This will result in an associated disengagement of the linkage assembly 17 from the recess 21 consequentially isolating this particular circuit from the control function. In the case where the failure is in the primary control circuit this invention ensures that the secondary control standby means (not described here) can be brought into operation unaffected by undesirable residual forces in the primary circuit.

What is claimed is:

1. A flying control system for aircraft including control surface means, pilot's control input means and control circuit means interconnecting said control surface means and said pilot's control input means, said control circuit means including a dual cable control mechanism for transmitting pilot's control demand to said control surface means and circuit disengagement means associated with said control mechanism whereby should a cable break or disconnect occur in one of said dual cables, said circuit disengagement means will render said control circuit ineffective, thereby effectively isolating said control surface or pilot's control input means from adverse residual forces induced by the elastic recovery of the remaining cable, said dual cable control mechanism comprising:

(a) a control shaft rotatably mounted upon the aircraft and including lever means for transmitting mechanical output to control surface means in response to pilot's demand;

(b) first and second quadrant pulley portions mounted for independent rotational movement upon said control shaft each having attached thereto one of said dual cables;

(c) locking and circuit disengaging means for locking said first and second pulley portions to said control shaft for the transmission of pilot's control demands to said lever means and for instantaneous disengagement of said locking and isolation of said control circuit means upon failure of one of said cables; and (d) spring means independently associated with each of said first and second pulley portions for reacting the installed tension in the respective cable and enhancing the locking engagement between said pulley portions and said control shaft, said spring means being configured such that the installed loading is always less than that of the installed tension in the cables, the arrangement being such that in normal operational use said first and second quadrant pulley portions are constrained to move in unison to effect the desired control function but a single cable failure will cause the associated quadrant pulley portion to move differentially with respect to the other under the effect of its associated spring means, said differential movement causing instantaneous disengagement of said locking means and associated isolation of control surface means from pilot's control input means.

2. A control system according to claim 1 in which said locking and disengaging means comprises a first link pivotally located to said first quadrant pulley portion, a second link pivotally located to said second quadrant pulley portion, said first and second links convergently extending from said pivotal locations and pivotally located to each other at their intersection, said links being commonly configured at said intersection for locking engagement with said control shaft.

3. A control system according to claim 1 in which said spring means comprises a first spring pivotally located at a first pivotal location to said first quadrant pulley portion and at a second pivotal location to said control shaft, and a second spring pivotally located at a first pivotal location to said second quadrant pulley portion and at a second pivotal location to said control shaft.

4. A control system according to claim 1 or claim 3 in which the control shaft further includes a concentric disc providing abutment faces for the respective first and second quadrant pulley portions, said disc incorporating a recess for engaging said locking and engagement means and attachment means for said first and second spring means.

* * * * *